United States Patent
Donovan et al.

(10) Patent No.: US 10,972,142 B1
(45) Date of Patent: Apr. 6, 2021

(54) WIRELESS NETWORKING TRANSCEIVER SYSTEM WITH SHARED MEMORY

(71) Applicant: NXP USA, Inc., Austin, TX (US)

(72) Inventors: Timothy J. Donovan, Livermore, CA (US); Yui Lin, Palo Alto, CA (US); Lite Lo, San Jose, CA (US); Zhengqiang Huang, Dublin, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/929,178

(22) Filed: Dec. 5, 2019

Related U.S. Application Data

(60) Provisional application No. 62/775,741, filed on Dec. 5, 2018.

(51) Int. Cl.
*H04B 1/38* (2015.01)

(52) U.S. Cl.
CPC ...................... *H04B 1/38* (2013.01)

(58) Field of Classification Search
CPC . H04B 1/38; H04B 1/40; H04B 1/126; H04B 1/406; H04B 2203/5441; H04B 3/46; H04B 3/542; H04B 3/56
See application file for complete search history.

(56) References Cited

U.S. PATENT DOCUMENTS

| | | | | |
|---|---|---|---|---|
| 6,587,922 B2* | 7/2003 | Higuchi | ............ | G06F 12/0817 711/120 |
| 7,133,646 B1* | 11/2006 | Miao | ............ | H04B 1/38 455/73 |
| 7,693,544 B2* | 4/2010 | Segev | ............ | H04B 7/0817 455/553.1 |
| 10,185,673 B2* | 1/2019 | Yoon | ............ | G06F 13/1663 |

* cited by examiner

*Primary Examiner* — Nhan T Le

(57) ABSTRACT

Wireless networking transceiver circuitry for an integrated circuit device includes a plurality of wireless networking transceiver subsystems, each subsystem including respective processing circuitry configurable for coupling to radio circuitry to implement a respective set of protocol features selected from at least one overall set of protocol features. Memory circuitry is provided, sufficient to support a respective set of protocol features in each subsystem when at least one respective set of protocol features is smaller than the overall set of protocol features. Memory-sharing circuitry is provided, configurable to couple respective portions of the memory circuitry to the processing circuitry of respective subsystems. The memory circuitry and the memory-sharing circuitry may be outside the subsystems, or distributed within the subsystems. The memory may be 60% of an amount of memory sufficient to support the overall set of protocol features in all subsystems. Each processing circuit may be coupled to radio circuitry.

22 Claims, 3 Drawing Sheets

US 10,972,142 B1

WIRELESS NETWORKING TRANSCEIVER SYSTEM WITH SHARED MEMORY

CROSS REFERENCE TO RELATED APPLICATION

This disclosure claims the benefit of commonly-assigned U.S. Provisional Patent Application No. 62/775,741, filed Dec. 5, 2018, which is hereby incorporated by reference herein in its entirety.

FIELD OF USE

This disclosure relates to devices including multiple wireless networking transceiver subsystems. More particularly, this disclosure relates to wireless networking transceiver subsystems configurable to share memory for protocol feature sets.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A wireless networking transceiver of the type commonly referred to by the trademark BLUETOOTH® typically includes, in addition to BLUETOOTH® radio circuitry, processing circuitry and memory for executing BLUETOOTH® functions. For example, the amount of memory required to support a full BLUETOOTH® feature set is measured in the hundreds of kilobytes. However, a particular implementation may call for less than the full feature set, or for an earlier BLUETOOTH® version, in which even the full feature set requires less memory than a more recent version. Some implementations may call for more than one instantiation of a BLUETOOTH® transceiver. Or an implementation may call for instantiation of a combination of Wi-Fi and BLUETOOTH® transceivers. Each Wi-Fi transceiver may have radio, processing circuitry and memory requirements comparable to the requirements of a BLUETOOTH® transceiver.

Heretofore, in providing an integrated circuit device (e.g., a system-on-chip) for such implementations, unless the specific intended configuration was known, each transceiver would be provided with sufficient memory for the largest possible BLUETOOTH® or Wi-Fi feature set, which would result in wasted unused memory in the event that one or more of the instantiated BLUETOOTH® or Wi-Fi transceivers implemented less than the largest possible feature set. Indeed, in some known implementations, extra memory was provided, even where the current requirements were known, against the possibility of future upgrades, resulting in even more potentially wasted memory.

SUMMARY

Wireless networking transceiver circuitry for an integrated circuit device according to a first implementation of the subject matter of this disclosure includes a plurality of wireless networking transceiver subsystems, each respective wireless networking transceiver subsystem in the plurality of wireless networking transceiver subsystems including respective processing circuitry configurable for coupling to radio circuitry to implement a respective set of wireless networking transceiver protocol features selected from at least one overall set of wireless networking transceiver protocol features, wherein each respective set of wireless networking transceiver protocol features requires a respective amount of memory, and respective memory circuitry sufficient to support one of the respective sets of wireless networking transceiver protocol features that is smaller than the at least one overall set of wireless networking transceiver protocol features. At least one of the respective sets of wireless networking transceiver protocol features requires an amount of memory that is greater than capacity of the respective memory circuitry in its respective wireless networking transceiver subsystem. Memory-sharing circuitry is provided and is configurable to couple at least a portion of the respective memory circuitry of a first one of the respective wireless networking transceiver subsystems to the respective processing circuitry of a second one of the respective wireless networking transceiver subsystems.

In the wireless networking transceiver circuitry of the first implementation, the memory-sharing circuitry may further be configurable to couple at least a portion of the respective memory circuitry of the second one of the respective wireless networking transceiver subsystems to the respective processing circuitry of the first one of the respective wireless networking transceiver subsystems.

In the wireless networking transceiver circuitry of the first implementation, the memory-sharing circuitry may include multiplexer circuitry. In one variant of such an implementation, the respective memory circuitry of each one of the respective wireless networking transceiver subsystems may include a plurality of banks of memory, the multiplexer circuitry may include a respective first multiplexer in each respective one of the respective wireless networking transceiver subsystems, the respective first multiplexer having a plurality of first multiplexer inputs, each first multiplexer input in the plurality of multiplexer inputs being coupled to one of (a) a bank of memory in the plurality of banks of memory of the respective one of the wireless networking transceiver subsystems and (b) a bank of memory of another one of the wireless networking transceiver subsystems, the respective first multiplexer further having a first multiplexer output coupled to respective processing circuitry of the respective one of the wireless networking transceiver subsystems.

In that variant, the multiplexer circuitry may further include a respective second multiplexer in each respective one of the respective wireless networking transceiver subsystems, the respective second multiplexer having a plurality of second multiplexer inputs, each second multiplexer input in the plurality of multiplexer inputs being coupled to one of (a) the respective processing circuitry of the respective one of the wireless networking transceiver subsystems and (b) the respective processing circuitry of another one of the wireless networking transceiver subsystems, the respective second multiplexer further having a plurality of second multiplexer outputs, each of the second multiplexer outputs being respectively coupled to a respective bank of memory in the plurality of banks of memory of the respective one of the wireless networking transceiver subsystems.

Also in that variant, the plurality of banks of memory in each one of the respective wireless networking transceiver subsystems may be 60% of a number of banks of memory sufficient to support the at least one overall set of wireless networking transceiver protocol features.

In the wireless networking transceiver circuitry of the first implementation, the plurality of wireless networking transceiver subsystems may include two wireless networking transceiver subsystems.

In the wireless networking transceiver circuitry of the first implementation, one of the at least one overall set of wireless networking transceiver protocol features may include a set of BLUETOOTH® protocol features.

In the wireless networking transceiver circuitry of the first implementation, one of the at least one overall set of wireless networking transceiver protocol features may include a set of Wi-Fi protocol features.

In the wireless networking transceiver circuitry of the first implementation, the respective memory circuitry of each of the plurality of short-range transceiver subsystems may include excess memory for feature growth.

Wireless networking transceiver circuitry for an integrated circuit device according to a second implementation of the subject matter of this disclosure includes a plurality of processing circuits, each respective processing circuit being configurable for coupling to radio circuitry to implement a respective set of wireless networking transceiver protocol features selected from at least one overall set of wireless networking transceiver protocol features, where each respective set of wireless networking transceiver protocol features requires a respective amount of memory. Memory circuitry is provided that is sufficient to support all of the respective sets of wireless networking transceiver protocol features when at least one of the respective sets of wireless networking transceiver protocol features is smaller than the at least one overall set of wireless networking transceiver protocol features, but insufficient to support all of the respective sets of wireless networking transceiver protocol features when each respective set of wireless networking transceiver protocol features includes all of the at least one overall set of wireless networking transceiver protocol features. Memory-sharing circuitry is provided and is configurable to couple a respective portion of the memory circuitry to each respective processing circuit, each respective portion of the memory circuitry being sufficient to support the respective set of wireless networking transceiver protocol features of the respective processing circuit.

In the wireless networking transceiver circuitry of the second implementation, the memory-sharing circuitry may include multiplexer circuitry. In a variant of such an implementation, the memory circuitry may include a plurality of banks of memory, the multiplexer circuitry may include a respective multiplexer corresponding to each respective processing circuit, the respective multiplexer having a multiplexer output coupled to the respective processing circuitry, the respective multiplexer further having a plurality of multiplexer inputs, each respective multiplexer input in the plurality of multiplexer inputs being coupled to a respective bank of memory in the plurality of banks of memory. In addition, each respective multiplexer may also be a respective demultiplexer, each multiplexer output being a demultiplexer input, and each multiplexer input being a demultiplexer output.

In that variant, the plurality of banks of memory in each one of the respective wireless networking transceiver subsystems may be 60% of a number of banks of memory sufficient to support the at least one overall set of wireless networking transceiver protocol features.

In the wireless networking transceiver circuitry of the second implementation, one of the at least one overall set of wireless networking transceiver protocol features may include a set of BLUETOOTH® protocol features.

In the wireless networking transceiver circuitry of the second implementation, one of the at least one overall set of wireless networking transceiver protocol features may include a set of Wi-Fi protocol features.

In the wireless networking transceiver circuitry of the second implementation, the memory circuitry may include excess memory for feature growth.

A method according to a third implementation of the subject matter of this disclosure, for configuring wireless networking transceiver circuitry for an integrated circuit device, the wireless networking transceiver circuitry having a plurality of processing circuits, memory circuitry sufficient to support a plurality of respective sets of wireless networking transceiver protocol features when at least one of the respective sets of wireless networking transceiver protocol features is smaller than at least one overall set of wireless networking transceiver protocol features, but insufficient to support all respective sets of wireless networking transceiver protocol features when each respective set of wireless networking transceiver protocol features includes all of the at least one overall set of wireless networking transceiver protocol features, and memory-sharing circuitry, includes configuring each respective processing circuit for coupling to radio circuitry to implement a respective set of wireless networking transceiver protocol features selected from at least one overall set of wireless networking transceiver protocol features, wherein each respective set of wireless networking transceiver protocol features requires a respective amount of memory, and configuring the memory sharing circuitry to couple a respective portion of the memory circuitry to each respective processing circuit, each respective portion of the memory circuitry being sufficient to support the respective set of wireless networking transceiver protocol features of the respective processing circuit.

In a method according to the third implementation, the configuring each respective processing circuit may include configuring one of the plurality of processing circuits to implement a set of BLUETOOTH® protocol features.

In a method according to the third implementation, the configuring each respective processing circuit may include configuring one of the plurality of processing circuits to implement a set of Wi-Fi protocol features.

In a method according to the third implementation, when the memory circuitry is provided as a plurality of banks of memory, the configuring the memory sharing circuitry to couple a respective portion of the memory circuitry to each respective processing circuit may include configuring the memory sharing circuitry to couple memory to each respective processing circuit in units of banks of memory.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
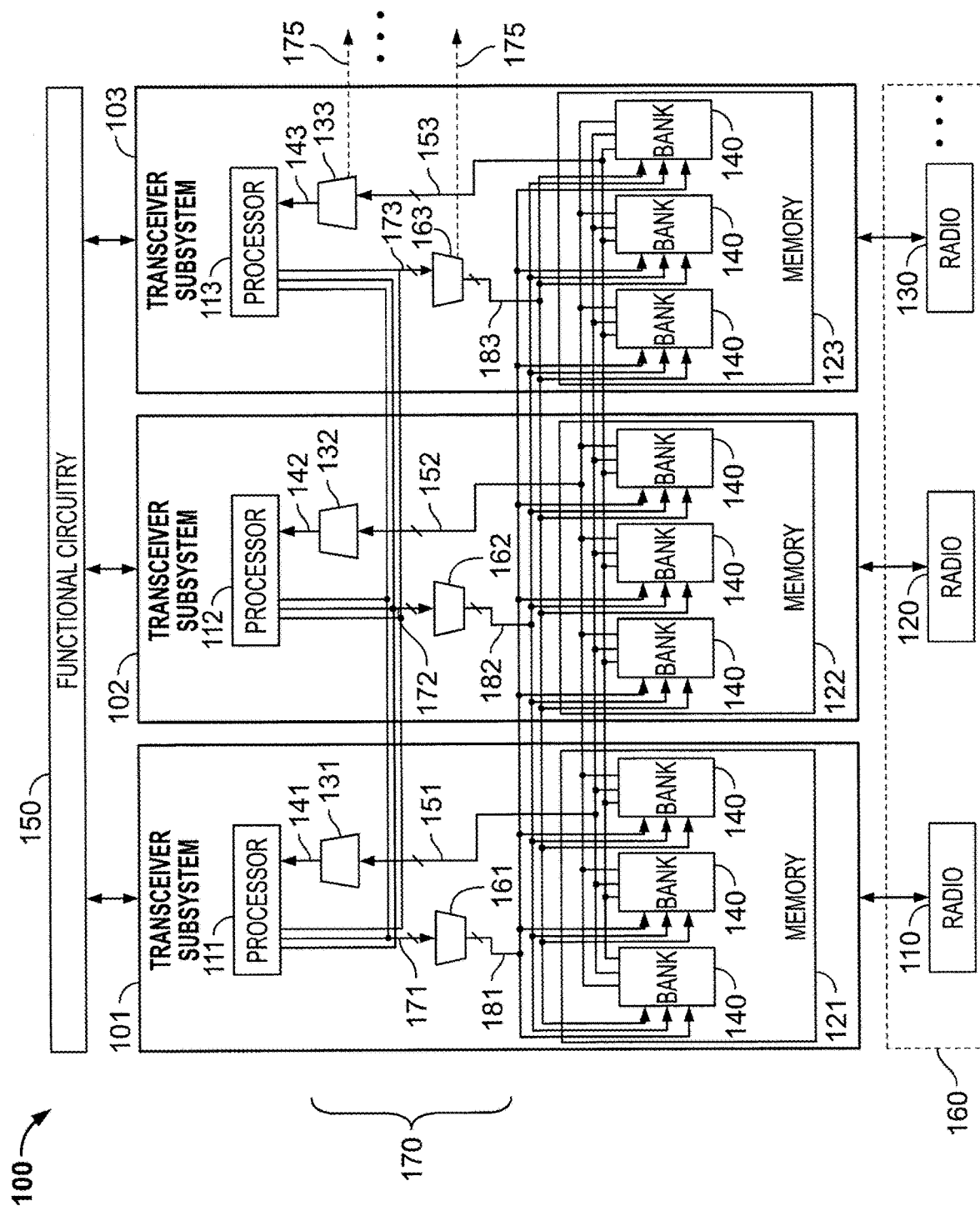
FIG. 1 is a diagram of a device incorporating a first implementation of the subject matter of this disclosure.

As noted above, heretofore, in providing an integrated circuit device (e.g., a system-on-chip or a deep submicron chip with multiple central processing units (CPUs)) with the option of one or more wireless networking transceivers, unless the specific intended configuration was known, transceivers such as BLUETOOTH® or Wi-Fi transceivers would be provided with sufficient memory for the largest possible feature set, which would result in wasted unused memory in the event that one or more of the instantiated BLUETOOTH® or Wi-Fi transceivers implemented less than the largest possible feature set. Indeed, in some known implementations, extra memory was provided, even where the current requirements were known, against the possibility of future upgrades, resulting in even more potentially wasted memory.

Thus, for a known device with multiple transceivers, for every transceiver subsystem, the worst-case memory requirement (i.e., the minimum memory requirement for each transceiver subsystem) would be determined, and then a certain percentage (e.g., 30%) would be added for potential upgrades. For example, a three-transceiver system may include a first transceiver subsystem having a CPU running a wireless protocol application that requires 500 kB of memory, a second transceiver subsystem having a CPU running a wireless protocol application that also requires 500 kB of memory, and a third transceiver subsystem having a CPU running a wireless protocol application that requires 400 kB of memory. The total amount of memory allocated according to known approaches adds 30% more memory to each independent transceiver subsystem for expansion, for a total of (1.3×500 kB)+(1.3×500 kB)+(1.3×400 kB)=1,820 kB of memory. However, in most cases, most of the time, not all, or even any, of the wireless protocol applications will use the entire allocated memory including the 30% expansion memory. Moreover, there may be cases where, even though the total memory usage is less than the total available memory, the wireless protocol application running on one subsystem will require more than its available memory including the 30% expansion memory, and therefore that wireless protocol application will run out of memory.

In accordance with implementations of the subject matter of this disclosure, a configurable memory pool for the transceiver subsystems of an integrated circuit device may be provided. At the time of device initialization, memory in the pool can be configured and assigned to each respective transceiver subsystem according to the requirements of its respective wireless protocol application. Because the memory is pooled among the various transceiver subsystems, less expansion memory need be provided. For example, for the same requirements described above but using pooled memory, 20% expansion memory can be provided instead of 30% expansion memory, or (1.2×500 kB)+(1.2×500 kB)+(1.2×400 kB)=1,680 kB of total memory, which is a 7.7% reduction in total memory. Nevertheless, the expansion memory is 1,680-1,400=280 kB, all which is available to each transceiver subsystem. Because it is likely that only one transceiver subsystem will need substantial expansion memory, that transceiver subsystem will have 280 kB of expansion memory available to it, as opposed to only 150 kB (i.e., 30% of 500 kB) in the example above, even though the total amount of memory is less than in the example above.

The total memory in the pool may be physically distributed among the individual transceiver subsystems as in the known transceiver subsystems described above, with memory-sharing circuitry added to allow each transceiver subsystem to selectively utilize memory from one or more of the other transceiver subsystems. Alternatively, a single block of memory may be provided, with memory-sharing circuitry provided to couple each transceiver subsystem to as much of the block of memory as it needs. In a further variation of either implementation, the memory sharing circuitry also may make unused memory in the block of memory available to other portions of the integrated circuit device.

One result of such configurations is that the integrated circuit device may be modular in nature. That is, even though different ones of the multiple transceiver subsystems may have different memory requirements, each of the multiple transceiver subsystems of the device may be identical, thereby simplifying manufacture. Nevertheless, because memory within any one transceiver subsystem can be selectively shared with any other one of the transceiver subsystems other transceiver subsystems, the individual transceiver subsystems may operate as though they are not identical.

FIG. 1 shows a first device implementation 100 of subject matter according to this disclosure, in which an individual transceiver subsystem 101, 102, 103, etc., includes processing circuitry 111, 112, 113 and memory 121, 122, 123, while memory-sharing circuitry 170 allows each transceiver subsystem 101, 102, 103 to selectively utilize memory from another of subsystems 101, 102, 103.

Implementation 100 of the subject matter according to this disclosure may be an integrated circuit device including, in addition to individual transceiver subsystems 101, 102, 103, etc., functional circuitry 150 coupled to the individual transceiver subsystems 101, 102, 103, etc., that performs a user function or functions and, as part of performing those functions, receives data from or provides data to the individual transceiver subsystems 101, 102, 103, etc. Device 100 also includes radio circuitry 110, 120, 130, etc., respectively coupled to individual transceiver subsystem 101, 102, 103, etc. Although individual blocks of radio circuitry 110, 120, 130, etc., are shown, radio circuitry 110, 120, 130, etc., may be implemented as a single block 160 of shared radio circuitry.

Although device 100 is shown as having three individual transceiver subsystems, it is within the subject matter of the present disclosure to have as few as two individual transceiver subsystems, and there is no upper limit on the number of individual transceiver subsystems. Each transceiver subsystem may be a wireless networking transceiver operating according to a BLUETOOTH® or Wi-Fi protocol. It is contemplated that at least one of the individual transceiver subsystems will operate with a feature set different from another, or from others, of the individual transceiver subsystems. For example, there could be individual transceiver subsystems operating two different BLUETOOTH® feature sets, or a BLUETOOTH® transceiver subsystem and a Wi-Fi transceiver subsystem, or a Wi-Fi transceiver subsystem and two BLUETOOTH® transceiver subsystems each having a different feature set.

In the example illustrated in FIG. 1, each individual transceiver subsystem 101, 102, 103 of device 100 has memory circuitry 121, 122, 123 made up of individual memory banks 140. In this example, implementing a maximum possible feature set may require five memory banks 140, including the aforementioned expansion memory. Thus each individual transceiver subsystem 101, 102, 103 includes only 60% of the amount of memory needed to implement a maximum possible feature set. However, this is only an example, and memory circuitry in the individual transceiver subsystems may constitute other fractions of the amount of memory needed to implement a maximum possible feature set. Nevertheless, as noted above, it is advantageous from a manufacturing standpoint to implement the individual transceiver subsystems in a modular manner, providing the same number of memory banks 140 in each individual transceiver subsystem.

As noted above, device 100 also includes memory-sharing circuitry 170 that allows and individual one of transceiver subsystems 101, 102, 103 to selectively utilize memory from another one or more of individual transceiver subsystems 101, 102, 103. In the implementation of device 100, the memory-sharing circuitry 170 is distributed across the individual transceiver subsystems 101, 102, 103. In modular implementations, each individual transceiver subsystem may have the same amount of memory distributed across the same number of memory banks 140.

Each individual transceiver subsystem 101, 102, 103 includes, as part of the memory-sharing circuitry 170, a respective first multiplexer 131, 132, 133 whose output 141, 142, 143 is coupled to the respective processing circuitry 111, 112, 113 of respective individual transceiver subsystem 101, 102, 103. The inputs 151, 152, 153 of each respective first multiplexer 131, 132, 133 are coupled to all of the memory banks 140 in respective individual transceiver subsystem 101, 102, 103, as well as to memory banks 140 in others of the individual transceiver subsystem 101, 102, 103. The coupling to memory banks 140 in others of the individual transceiver subsystem 101, 102, 103 may be fully populated (i.e., all memory banks 140 in each of the individual transceiver subsystems 101, 102, 103 are coupled to the first multiplexers of all others of the individual transceiver subsystems 101, 102, 103; as shown) or sparsely populated (i.e., only some memory banks 140 in each of the individual transceiver subsystems 101, 102, 103 are coupled to the first multiplexers of others of the individual transceiver subsystems 101, 102, 103; not shown) according to a statistical determination of the amount of memory sharing likely to be required in an implementation.

Each individual transceiver subsystem 101, 102, 103 also includes, as part of the memory-sharing circuitry 170, a respective second multiplexer 161, 162, 163 whose inputs 171, 172, 173 are coupled to the respective processing circuitry 111, 112, 113 of respective individual transceiver subsystem 101, 102, 103. The outputs 181, 182, 183 of each respective second multiplexer 161, 162, 163 are coupled to all of the memory banks 140 in respective individual transceiver subsystem 101, 102, 103, as well as to memory banks 140 in others of the individual transceiver subsystem 101, 102, 103. The coupling to memory banks 140 in others of the individual transceiver subsystem 101, 102, 103 may be fully populated (i.e., all memory banks 140 in each of the individual transceiver subsystems 101, 102, 103 are coupled to the second multiplexers of all others of the individual transceiver subsystems 101, 102, 103; as shown) or sparsely populated (i.e., only some memory banks 140 in each of the individual transceiver subsystems 101, 102, 103 are coupled to the second multiplexers of others of the individual transceiver subsystems 101, 102, 103; not shown) according to a statistical determination of the amount of memory sharing likely to be required in an implementation.

Optional connections 175 allow some of memory banks 140 to selectively be used by portions of device 100 outside the transceiver subsystems.

Figure 2:
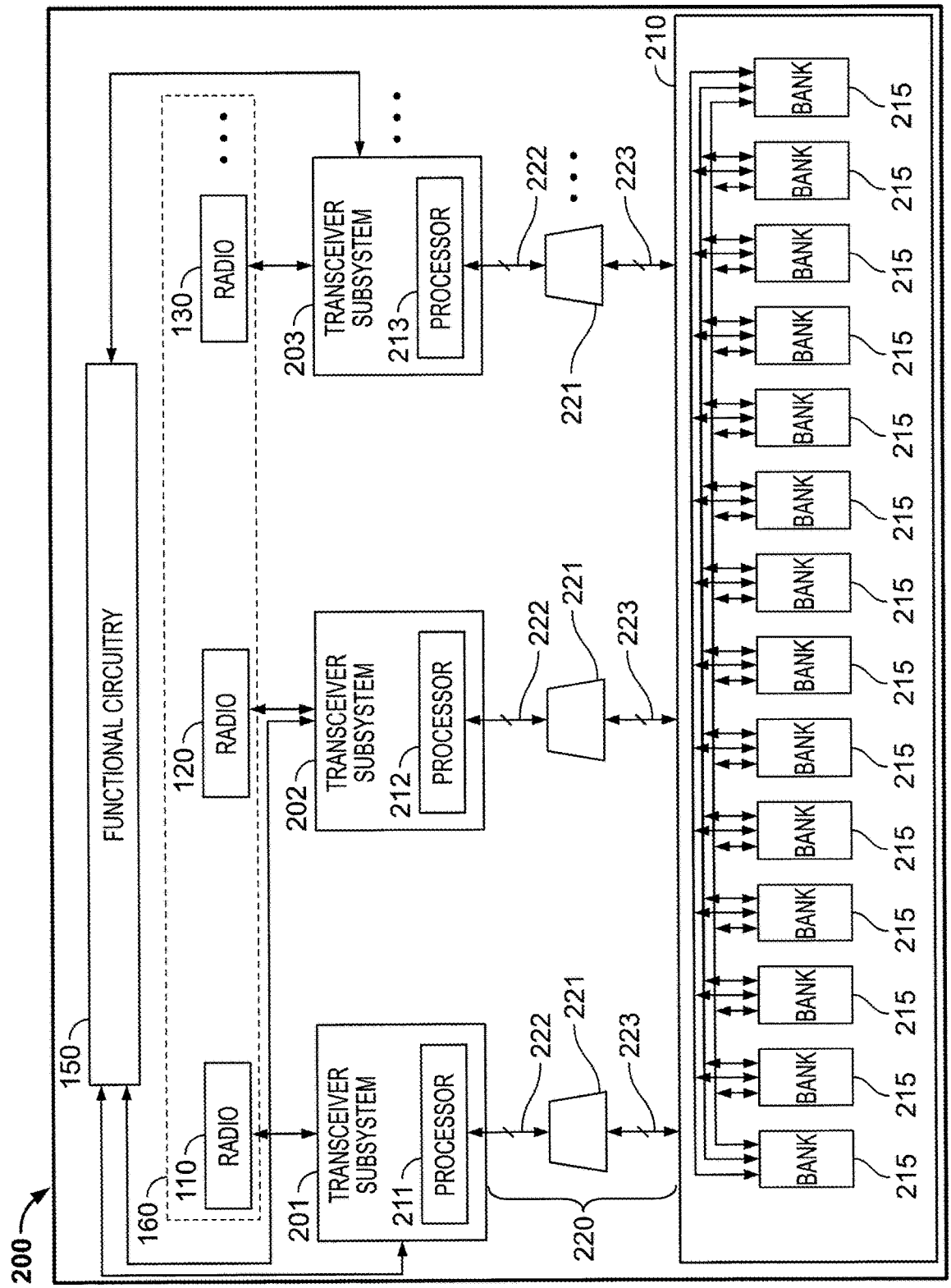
FIG. 2 is a diagram of a device incorporating a second implementation of the subject matter of this disclosure.

FIG. 2 shows a second implementation 200 of subject matter according to this disclosure, in which an individual transceiver subsystem 201, 202, 203, etc., includes processing circuitry 211, 212, 213. Like implementation 100, implementation 200 of the subject matter according to this disclosure may be an integrated circuit device including, in addition to individual transceiver subsystems 201, 202, 203, etc., functional circuitry 150 coupled to the individual transceiver subsystems 201, 202, 203, etc., to receive data from or provide data to the individual transceiver subsystems 201, 202, 203, etc. Device 200 also includes radio circuitry 110, 120, 130, etc., respectively coupled to individual transceiver subsystem 201, 202, 203, etc. Although individual radio circuitry 110, 120, 130, etc. are shown, radio circuitry 110, 120, 130, etc. may be implemented as a single block 160 of shared radio circuitry.

Although device 200 is shown as having three individual transceiver subsystems, it is within the subject matter of the present disclosure to have as few as two individual transceiver subsystems, and there is no upper limit on the number of individual transceiver subsystems. Each transceiver subsystem may be a wireless networking transceiver operating according to a BLUETOOTH® or Wi-Fi protocol. It is contemplated that at least one of the individual transceiver subsystems will operate with a feature set different from another, or from others, of the individual transceiver subsystems. For example, there could be individual transceiver subsystems operating two different BLUETOOTH® feature sets, or a BLUETOOTH® transceiver subsystem and a Wi-Fi transceiver subsystem, or a Wi-Fi transceiver subsystem and two BLUETOOTH® transceiver subsystems each having a different feature set.

Unlike implementation 100, in the device of implementation 200, the individual transceiver subsystems 201, 202, 203 are serviced by shared memory 210 which, along with memory-sharing circuitry 220, is outside individual transceiver subsystems 201, 202, 203. Memory-sharing circuitry 220 allows each transceiver subsystem 201, 202, 203 to selectively utilize as much memory as it needs from shared memory 210 to implement its wireless networking transceiver protocol. Shared memory 210 is sized smaller than what would be needed for each transceiver subsystem 201, 202, 203 to implement a maximum possible protocol feature set. For example, shared memory 210 may have a total capacity that is 60% of the memory that would be needed for each transceiver subsystem 201, 202, 203 to implement a maximum possible protocol feature set; however, that fraction is just an example.

Memory-sharing circuitry 220 may include a respective multiplexer/demultiplexer 221 corresponding to respective processing circuitry 211, 212, 213 of individual transceiver subsystems 201, 202, 203. Each multiplexer/demultiplexer 221 has a processor input/output 222 coupled to respective processing circuitry 211, 212, 213, and a plurality of memory inputs/outputs 223 coupled to shared memory 210. Shared memory 210 may include individual memory banks 215 similar to memory banks 140. If so, memory inputs/outputs 223 are coupled to individual memory banks 215 of shared memory 210.

In one variant at one extreme (as shown), each multiplexer/demultiplexer 221 has a number of memory inputs/outputs 223 corresponding to the total number of memory banks 215 in shared memory 210. In such a variant, any one of respective processing circuitry 211, 212, 213 of any individual transceiver subsystem 201, 202, 203 can fulfill its memory requirements using any combination of any of individual memory banks 215.

In another variant at another extreme (not shown), each multiplexer/demultiplexer 221 has a number of memory inputs/outputs 223 corresponding to just the number of memory banks 215 in shared memory 210 that would be required for the corresponding processing circuitry 211, 212, 213 to have access to sufficient memory to implement the largest possible feature set (including expansion memory as described above). Some of those memory banks 215 would also be coupled to at least one other memory input/output 223 of another one of multiplexer/demultiplexers 221 corresponding to another processing circuitry 211, 212, 213. The overlap might be, for example, 40%, so that each instance of processing circuitry 211, 212, 213 has "guaranteed" access to 60% of the amount of memory needed to implement the largest possible feature set, while still having the potential to access 100% of the amount of memory needed to implement the largest possible feature set.

Intermediate variants (also not shown), in which each instance of processing circuitry 211, 212, 213 has "guaranteed" access to more than 60%, but less than 100%, of the amount of memory needed to implement the largest possible feature set, are also possible, as are variants (not shown) in which each instance of processing circuitry 211, 212, 213 has "guaranteed" access to less than 60% of the amount of memory needed to implement the largest possible feature set.

As shown, implementation 100, in which the shared memory pool is distributed among individual transceiver subsystems 101, 102, 103, uses memory-sharing circuitry including first multiplexers 131, 132, 133 for moving data from the distributed shared memory to the respective processing circuitry, and second multiplexers 161, 162, 163 for moving data from the respective processing circuitry to the distributed shared memory. And as shown, implementation 200, in which the shared memory pool is outside the individual transceiver subsystems 201, 202, 203, uses multiplexer/demultiplexers 221 to move data in both directions between single shared memory block 210 and individual transceiver subsystems 201, 202, 203. However, an implementation (not shown) is possible in which the shared memory pool is distributed among individual transceiver subsystems, and can use multiplexer/demultiplexers to move data in both directions between the distributed shared memory and individual transceiver subsystems. Similarly, an implementation (not shown) is possible in which the shared memory pool is outside the individual transceiver subsystems and in which first multiplexers are used to move data from the distributed shared memory to the respective processing circuitry, while second multiplexers are used for moving data from the respective processing circuitry to the distributed shared memory.

Optional connections 225 allow some of memory banks 140 to selectively be used by portions of device 200 outside the transceiver subsystems.

Figure 3:
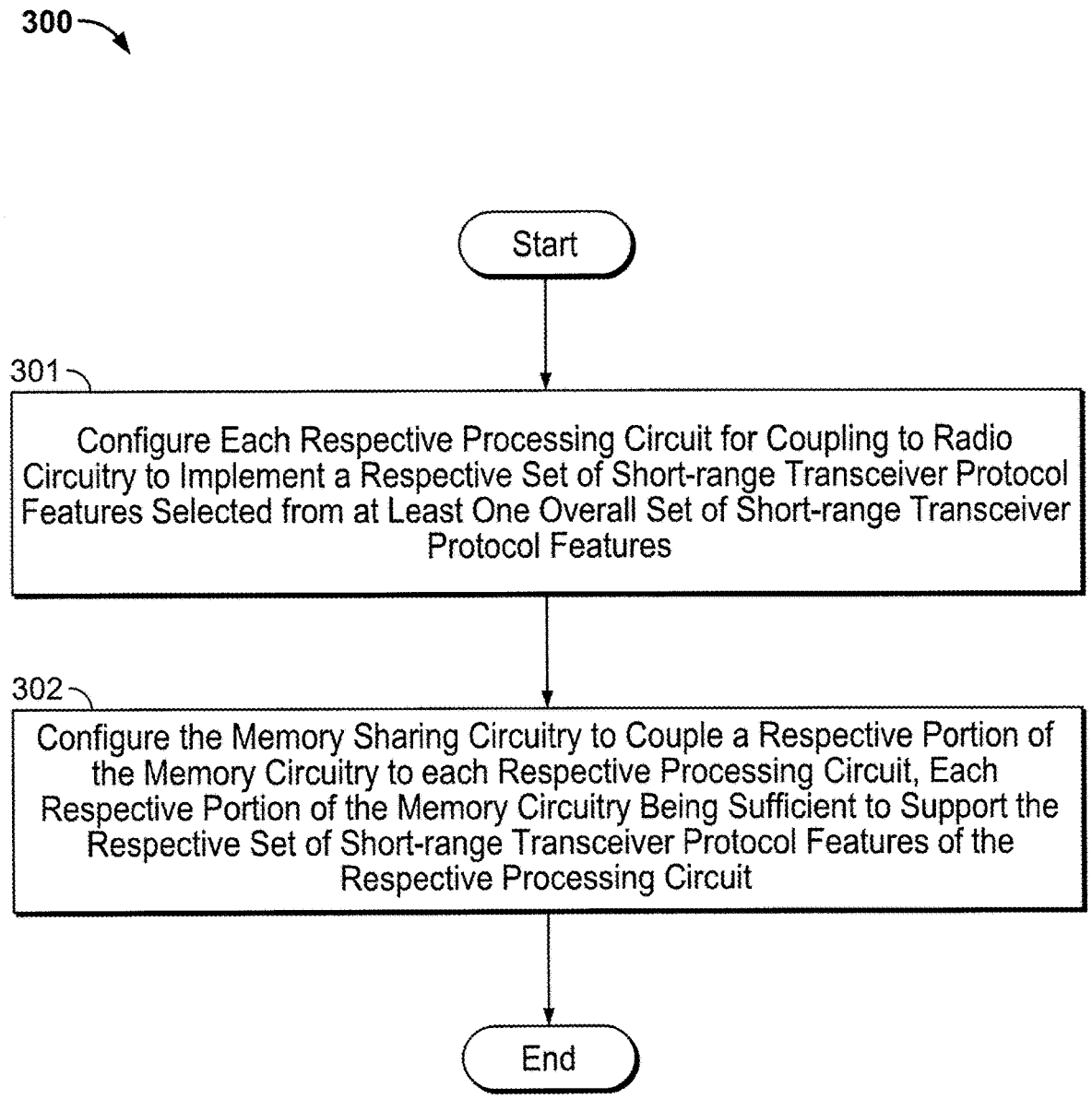
FIG. 3 is a flow diagram of a method according to an implementation of the subject matter of this disclosure.

A method 300 within the scope of the present disclosure, for configuring wireless networking transceiver circuitry for an integrated circuit device, where the wireless network transceiver circuitry has (a) a plurality of processing circuits, (b) memory circuitry sufficient to support a plurality of respective sets of wireless networking transceiver protocol features when at least one of the respective sets of wireless networking transceiver protocol features is smaller than at least one overall set of wireless networking transceiver protocol features, but insufficient to support all respective sets of wireless networking transceiver protocol features when each respective set of wireless networking transceiver protocol features includes all of the at least one overall set of wireless networking transceiver protocol features, and (c) memory-sharing circuitry, is a diagrammed in FIG. 3.

Method 300 begins at 301, where each respective processing circuit is configured for coupling to radio circuitry to implement a respective set of wireless networking transceiver protocol features selected from at least one overall set of wireless networking transceiver protocol features (each respective set of wireless networking transceiver protocol features requires a respective amount of memory). Next, at 302, the memory-sharing circuitry is configured to couple a respective portion of the memory circuitry to each respective processing circuit (each respective portion of the memory circuitry is sufficient to support the respective set of wireless networking transceiver protocol features of the respective processing circuit), and method 300 ends.

Thus it is seen that wireless networking transceiver subsystems configurable to share memory for protocol feature sets have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Wireless networking transceiver circuitry for an integrated circuit device, the wireless networking transceiver circuitry comprising:
   a plurality of wireless networking transceiver subsystems, each respective wireless networking transceiver subsystem in the plurality of wireless networking transceiver subsystems including:
   respective processing circuitry configurable for coupling to radio circuitry to implement a respective set of wireless networking transceiver protocol features selected from at least one overall set of wireless networking transceiver protocol features, wherein each respective set of wireless networking transceiver protocol features requires a respective amount of memory, and
   respective memory circuitry sufficient to support one of the respective sets of wireless networking transceiver protocol features that is smaller than the at least one overall set of wireless networking transceiver protocol features, at least one of the respective sets of wireless networking transceiver protocol features requiring an amount of memory that is greater than capacity of the respective memory circuitry in its respective wireless networking transceiver subsystem; and
   memory-sharing circuitry configurable to couple at least a portion of the respective memory circuitry of a first one of the respective wireless networking transceiver subsystems to the respective processing circuitry of a second one of the respective wireless networking transceiver subsystems.

2. The wireless networking transceiver circuitry of claim 1 wherein the memory-sharing circuitry is further configurable to couple at least a portion of the respective memory circuitry of the second one of the respective wireless networking transceiver subsystems to the respective processing circuitry of the first one of the respective wireless networking transceiver subsystems.

3. The wireless networking transceiver circuitry of claim 1 wherein the memory-sharing circuitry comprises multiplexer circuitry.

4. The wireless networking transceiver circuitry of claim 3 wherein:
   the respective memory circuitry of each one of the respective wireless networking transceiver subsystems comprises a plurality of banks of memory;
   the multiplexer circuitry comprises a respective first multiplexer in each respective one of the respective wireless networking transceiver subsystems, the respective first multiplexer having a plurality of first multiplexer inputs, each first multiplexer input in the plurality of multiplexer inputs being coupled to one of (a) a bank of memory in the plurality of banks of memory of the respective one of the wireless networking transceiver subsystems and (b) a bank of memory of another one of the wireless networking transceiver subsystems, the respective first multiplexer further having a first multiplexer output coupled to respective processing circuitry of the respective one of the wireless networking transceiver subsystems.

5. The wireless networking transceiver circuitry of claim 4 wherein:
the multiplexer circuitry further comprises a respective second multiplexer in each respective one of the respective wireless networking transceiver subsystems, the respective second multiplexer having a plurality of second multiplexer inputs, each second multiplexer input in the plurality of multiplexer inputs being coupled to one of (a) the respective processing circuitry of the respective one of the wireless networking transceiver subsystems and (b) the respective processing circuitry of another one of the wireless networking transceiver subsystems, the respective second multiplexer further having a plurality of second multiplexer outputs, each of the second multiplexer outputs being respectively coupled to a respective bank of memory in the plurality of banks of memory of the respective one of the wireless networking transceiver subsystems.

6. The wireless networking transceiver circuitry of claim 4 wherein the plurality of banks of memory in each one of the respective wireless networking transceiver subsystems is 60% of a number of banks of memory sufficient to support the at least one overall set of wireless networking transceiver protocol features.

7. The wireless networking transceiver circuitry of claim 1 wherein the plurality of wireless networking transceiver subsystems comprises two wireless networking transceiver subsystems.

8. The wireless networking transceiver circuitry of claim 1 wherein one of the at least one overall set of wireless networking transceiver protocol features comprises a set of BLUETOOTH® protocol features.

9. The wireless networking transceiver circuitry of claim 1 wherein one of the at least one overall set of wireless networking transceiver protocol features comprises a set of Wi-Fi protocol features.

10. The wireless networking transceiver circuitry of claim 1 wherein the respective memory circuitry of each of the plurality of short-range transceiver subsystems comprises excess memory for feature growth.

11. Wireless networking transceiver circuitry for an integrated circuit device, the wireless networking transceiver circuitry comprising:
a plurality of processing circuits, each respective processing circuit being configurable for coupling to radio circuitry to implement a respective set of wireless networking transceiver protocol features selected from at least one overall set of wireless networking transceiver protocol features, wherein each respective set of wireless networking transceiver protocol features requires a respective amount of memory;
memory circuitry sufficient to support all of the respective sets of wireless networking transceiver protocol features when at least one of the respective sets of wireless networking transceiver protocol features is smaller than the at least one overall set of wireless networking transceiver protocol features, but insufficient to support all of the respective sets of wireless networking transceiver protocol features when each respective set of wireless networking transceiver protocol features includes all of the at least one overall set of wireless networking transceiver protocol features; and
memory-sharing circuitry configurable to couple a respective portion of the memory circuitry to each respective processing circuit, each respective portion of the memory circuitry being sufficient to support the respective set of wireless networking transceiver protocol features of the respective processing circuit.

12. The wireless networking transceiver circuitry of claim 11 wherein the memory-sharing circuitry comprises multiplexer circuitry.

13. The wireless networking transceiver circuitry of claim 12 wherein:
the memory circuitry comprises a plurality of banks of memory;
the multiplexer circuitry comprises a respective multiplexer corresponding to each respective processing circuit, the respective multiplexer having a multiplexer output coupled to the respective processing circuitry, the respective multiplexer further having a plurality of multiplexer inputs, each respective multiplexer input in the plurality of multiplexer inputs being coupled to a respective bank of memory in the plurality of banks of memory.

14. The wireless networking transceiver circuitry of claim 13 wherein:
each respective multiplexer is also a respective demultiplexer, each multiplexer output being a demultiplexer input, and each multiplexer input being a demultiplexer output.

15. The wireless networking transceiver circuitry of claim 13 wherein the plurality of banks of memory in each one of the respective wireless networking transceiver subsystems is 60% of a number of banks of memory sufficient to support the at least one overall set of wireless networking transceiver protocol features.

16. The wireless network transceiver circuitry of claim 11 wherein one of the at least one overall set of wireless networking transceiver protocol features comprises a set of BLUETOOTH® protocol features.

17. The wireless networking transceiver circuitry of claim 11 wherein one of the at least one overall set of wireless networking transceiver protocol features comprises a set of Wi-Fi protocol features.

18. The wireless networking transceiver circuitry of claim 11 wherein the memory circuitry comprises excess memory for feature growth.

19. A method of configuring wireless networking transceiver circuitry for an integrated circuit device, the wireless networking transceiver circuitry having a plurality of processing circuits, memory circuitry sufficient to support a plurality of respective sets of wireless networking transceiver protocol features when at least one of the respective sets of wireless networking transceiver protocol features is smaller than at least one overall set of wireless networking transceiver protocol features, but insufficient to support all respective sets of wireless networking transceiver protocol features when each respective set of wireless networking transceiver protocol features includes all of the at least one overall set of wireless networking transceiver protocol features, and memory-sharing circuitry, the method comprising:

configuring each respective processing circuit for coupling to radio circuitry to implement a respective set of wireless networking transceiver protocol features selected from at least one overall set of wireless networking transceiver protocol features, wherein each respective set of wireless networking transceiver protocol features requires a respective amount of memory; and configuring the memory sharing circuitry to couple a respective portion of the memory circuitry to each respective processing circuit, each respective portion of the memory circuitry being sufficient to support the respective set of wireless networking transceiver protocol features of the respective processing circuit.

20. The method of claim 19 wherein the configuring each respective processing circuit comprises configuring one of the plurality of processing circuits to implement a set of BLUETOOTH® protocol features.

21. The method of claim 19 wherein the configuring each respective processing circuit comprises configuring one of the plurality of processing circuits to implement a set of Wi-Fi protocol features.

22. The method of claim 19 wherein, when the memory circuitry is provided as a plurality of banks of memory, the configuring the memory sharing circuitry to couple a respective portion of the memory circuitry to each respective processing circuit comprises configuring the memory sharing circuitry to couple memory to each respective processing circuit in units of banks of memory.

* * * * *